United States Patent
Luini et al.

(10) Patent No.: US 6,179,333 B1
(45) Date of Patent: Jan. 30, 2001

(54) BOUND PAPER ELEMENT WITH FUNCTIONAL SURFACES

(75) Inventors: Franco Luini; Nicolò Lurani, both of Milan (IT)

(73) Assignee: Lediberg S.p.A., San Paola d'argon (IT)

( * ) Notice: Under 35 U.S.C. 154(b), the term of this patent shall be extended for 0 days.

(21) Appl. No.: 09/117,572

(22) PCT Filed: Jun. 20, 1996

(86) PCT No.: PCT/EP96/02683

§ 371 Date: Sep. 28, 1998

§ 102(e) Date: Sep. 28, 1998

(87) PCT Pub. No.: WO97/28008

PCT Pub. Date: Aug. 7, 1997

(30) Foreign Application Priority Data

Feb. 2, 1996 (IT) ............................................ MI96A0182

(51) Int. Cl.$^7$ ...................................................... B42D 3/00
(52) U.S. Cl. ................................ 281/37; 281/29; 402/70; 402/73
(58) Field of Search .................................. 281/2, 5, 15.1, 281/21.1, 37, 38, 51; 402/4, 70, 73

(56) References Cited

U.S. PATENT DOCUMENTS

| 4,918,632 | * | 4/1990 | York | 402/4 X |
| 5,405,168 | * | 4/1995 | Holt | 281/2 |
| 5,599,048 | * | 2/1997 | Schioler | 281/38 X |
| 5,676,482 | * | 10/1997 | Hawkins | 281/38 X |
| 5,788,286 | * | 8/1998 | Hunt | 2281/38 X |

FOREIGN PATENT DOCUMENTS

| 2 685 112 | 12/1991 | (FR) . |
| 2 289 520 | 5/1994 | (GB) . |

* cited by examiner

Primary Examiner—Willmon Fridie, Jr.
(74) Attorney, Agent, or Firm—Cobrin & Gittes

(57) ABSTRACT

A notebook or similar page element that includes a plurality of bound pages, a first page provided with a limited friction surface, with the function of supporting and serving as a computer mouse pad, and a second page prepared with non-slip surface located on an extremity of the plurality of pages. The first page is arranged with a controlled-friction surface opposite to the non-slip surface of the second page.

8 Claims, 2 Drawing Sheets

BOUND PAPER ELEMENT WITH FUNCTIONAL SURFACES

BACKGROUND OF THE INVENTION

Field of the Invention

The present invention relates to a bound paper element, such as a notebook, index book, book or manual, note-block or similar.

Description of the Related Art

Such paper elements as the above (which for brevity will hereafter be referred to by the term "notebook") are well known and in common and frequent use, and for such reasons are constantly found on desks and worktops in offices and workshops. These worktops are occupied, not only with paperwork and other objects of work, but also by many other devices: computers, printers and similar machines.

Brief Summary of the Invention

An example of a known paper element according to the preamble of claim 1 is disclosed in U.S. Pat. No. 5,405,168, which relates a mouse pad or note pad comprising a stack of textured paper sheets secured to a substantially rigid base, the latter providing friction with respect to a support surface. In particular, the work surface of each paper sheet is a rough writing surface upon which notes can be written, even if not very neatly. The top paper sheet which provides the working surface can be removed after an extended amount of use in order to allow a proper contact between the track ball of the mouse and the textured surface of an underlying sheet.

Another example of a mouse pad is disclosed in FR-A-2685112. This mouse pad comprises a base element covered by a plurality of sheets made of paper or plastic material, each of which is provided with a thin coating of replaceable glue on the bottom side. Also in this case, the top sheet is removable when the working surface of the same is no more able to assure a proper operation of the mouse.

A similar solution is disclosed in GB-A-2289520, which relates to a mouse pad in which the top paper sheet is removed whenever necessary in order to reveal a clean top surface of an underlying sheet.

DISCLOSURE OF THE INVENTION

The purpose of the present invention is to modify such elements, or notebooks, to adapt them for an additional use, in order to reduce the space occupied on the worktops.

Such purpose is achieved by means of the present invention, which relates to a bound paper element comprising a plurality of bound pages, and at least a first page and a second page arranged at opposite extremities of at least part of said plurality of pages, characterised in that the first page is constituted by, or comprises, a layer in an embossed plastic material and the second page is constituted by, or comprises, a layer in an expanded thermoplastic material; and that the layer in embossed plastic material of the first page is arranged opposite to the layer in expanded thermoplastic material of the second page.

The first page provides therefore a layer having a controlled-friction surface, namely a surface suitable to support a computer mouse and to allow controlled and precise movements. Surfaces of this type are produced in embossed plastic (e.g. PVC, PP or PE), particularly with cusp-embossing. The second age provides a layer with a "non-slip" function in order to avoid the movement of the bound paper element with respect to a supporting plane.

According to another aspect of the invention, the first and the second page are internally provided with at least one layer made of material having a coefficient of friction to maintain them substantially fixed with respect to the underlying pages.

According to a further aspect of the invention, the angles of the notebook are rounded.

BRIEF DESCRIPTION OF THE SEVERAL VIEW OF DRAWINGS

The invention will now be described in more detail with reference to the enclosed drawings which are illustrative and not limiting, and in which.

DETAILED DESCRIPTION OF THE INVENTION

Figure 1:
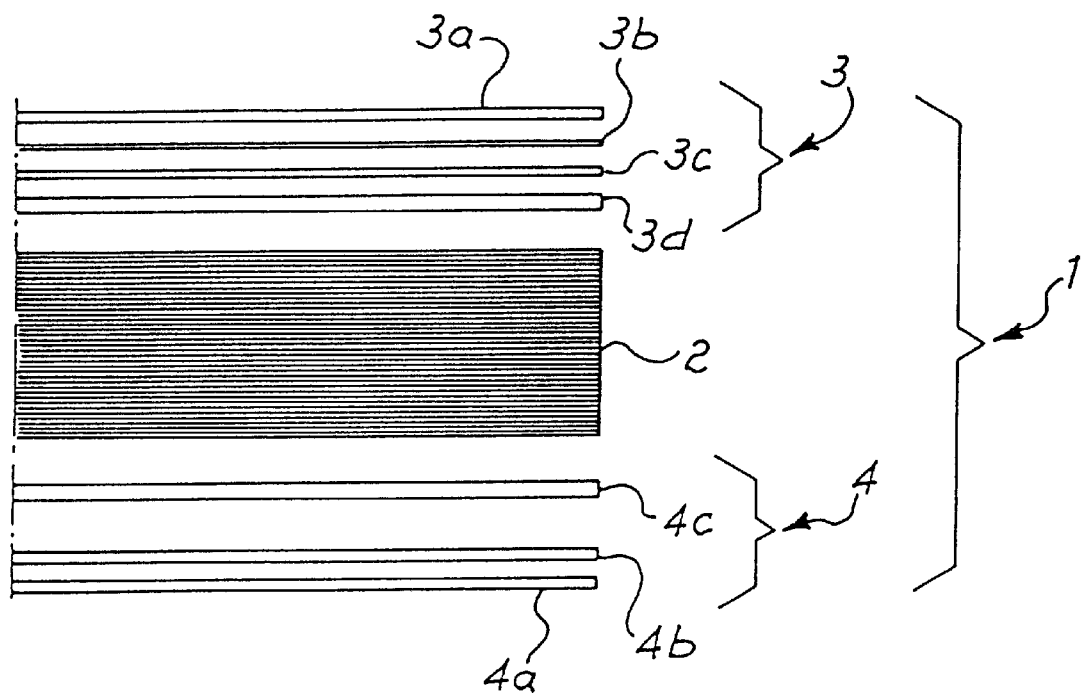
FIG. 1 is a schematic partial view and in exploded section of a preferential embodiment of the present invention.

As can be seen in these figures, the notebook 1 (or other bound paper element) according to the present invention presents a plurality of pages 2 of paper, which constitute the functional part for use as a notebook or index book or manual of instructions, etc.

The notebook 1 comprises a first page 3 provided with a controlled-friction surface, i.e. a fit surface to act as support for a computer "mouse" and a second page 4 provided with a material with a non-slip surface whose function is to prevent the movement of the notebook 1 with respect to the plane of support. The first page 3 and the second page 4 correspond therefore to the cover pages of the notebook 1 and are arranged at opposite extremities of the central pages 2.

The first page 3 generally comprises a layer 3a of an embossed, plastic material e.g. PVC, PP (polyproplene) or PE (polyethylene) or analogous material that furnishes the cited controlled-friction surface. The embossing has the function of improving the precision in the control of the movements of the "mouse" and is preferably of the cusp type. To improve the aesthetic appearance of the first page 3, the layer 3a is preferably of transparent material and is provided internally with a printed layer 3b and of a screen-printed base layer 3c.

The second page 4 comprises a layer 4a of thermoplastic material, generally expanded, with non-slip function. Materials suited to this use are the thermoplastic rubbers (preferably SBR) or analogous polymers, such as for instance those known as EDM and EPDM. The layer 4a is generally joined with a layer 4b in similar PVC material or, if necessary, embossed in the above way suitable for the first page 3.

In the preferred embodiment shown, the first and the second page are joined internally with a layer of material, 3d and 4c respectively, with a coefficient of such friction to maintain them substantially fixed with respect to the pages 2 (underlying page 3 and overlying the page 4). The material of the layers 3d and 4c are preferably rigid or joined in turn with a layer of rigid material. Materials proper are card and cardboard, thermoplastic resins and rubbers, if necessary applied as film on a rigid support.

In an alternative embodiment of the present invention, wherever the number of pages 2 is very high and the notebook 1 is very tall, the first page 3, with its controlled-friction surface, is placed in an intermediate position inside the plurality of pages 2. Therefore, opening the notebook 1, the "mouse" can be used on the embossed layer 3a. In this embodiment, page 3 can be provided with the layer 3d to maintain it substantially fixed with respect to the underlying pages 2.

The binding of the notebook 1 could be of any known type, for instance of the spiral or wi-reo type, of the open rigid type, of the paper covered type or of the so-called book or ribbon type, and will be such as to limit the possible movements between the pages of the notebook 1 under the pressures caused by the movements of the "mouse" on the first page 3.

With the same object of reducing to a minimum the possible relative movements of the pages of the notebook, one or more of the corners of the first and/or of the second page, and if necessary also the corners of all the pages of the notebook, are rounded. Generally there will be two rounded corners (opposite the binding) on the first and on the second page.

Figure 2:
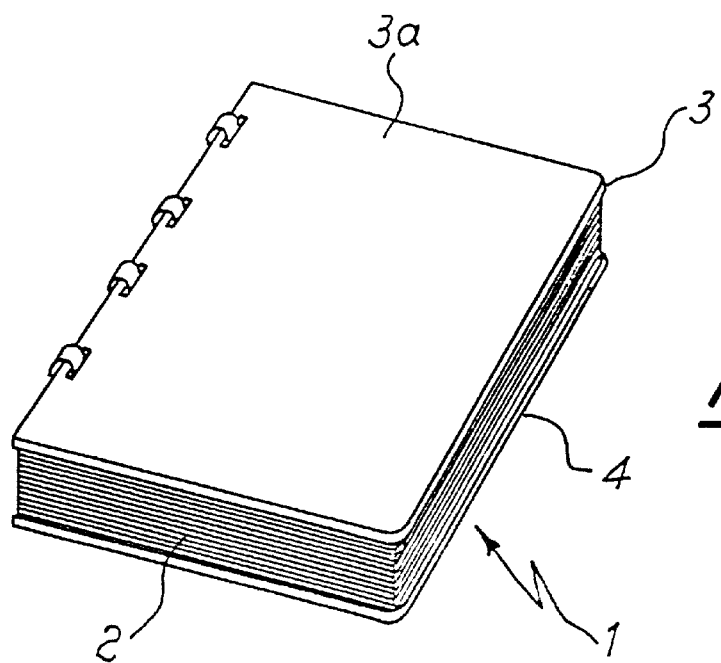
FIG. 2 is a perspective schematic view of the embodiment shown in FIG. 1.
Figure 3:
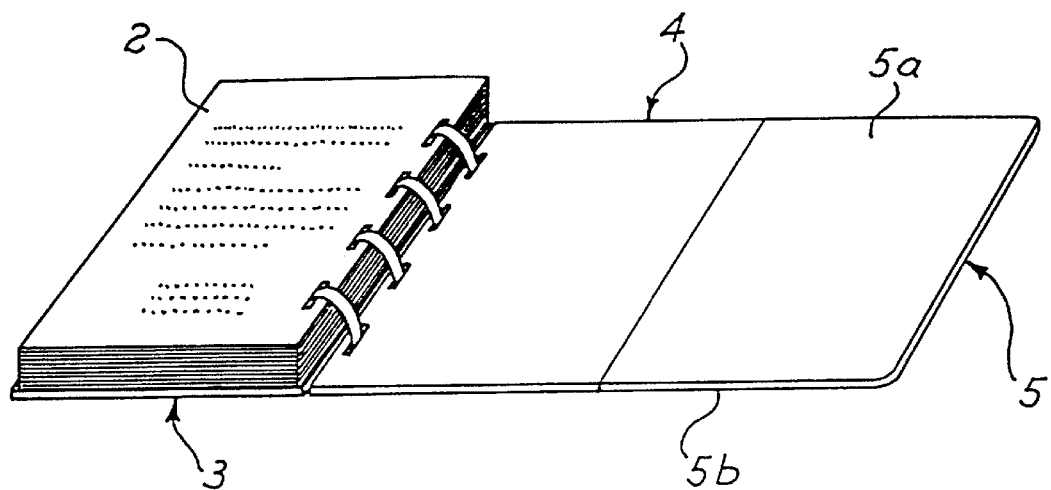
FIGS. 3 and 4 are perspective views of a further embodiment according to the invention.
Figure 4:
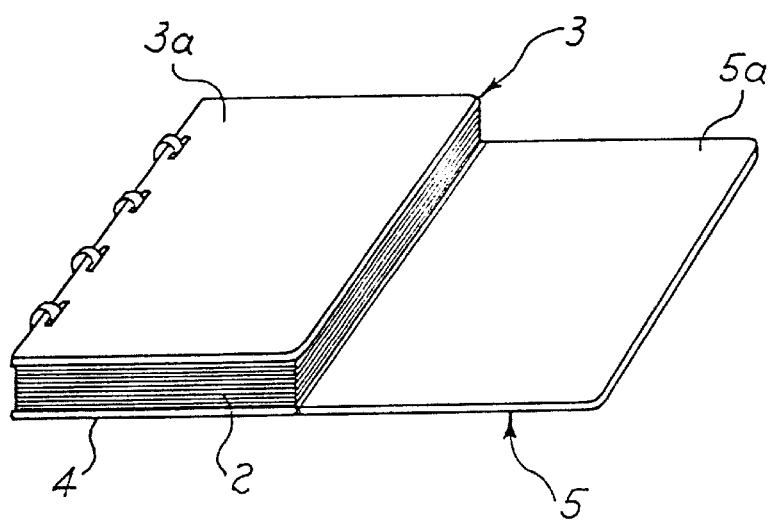

The FIG. 3 shows a variation of the embodiment according to the FIGS. 1 and 2, in which the second page 4 is provided with an extension 5 which can fold back onto page 4 when not in use. The extension 5 presents a lower layer 5b in similar non-slip material to that of the layer 4a of the page 4, as well as an upper layer 5a in similar controlled-friction material to that of the layer 3a of the page 3. The extension 5 can therefore be used for the movements of the "mouse" in addition or in alternative to the page 3. FIG. 4 shows a disposition of notebook also using the extension 5.

The production of the notebook according to the invention happens in the following way: the decorative layer 3b is at first applied by printing to the inside of the layer 3a and then the base layer 3c is screen-printed. Alternatively, the printing could be effected on the external side of layer 3a. Page 4 is produced by joining layer 4a with the layer 4b. The pages thus obtained are then preferably joined with the layers 3d and 4c, respectively.

What is claimed is:

1. A bound paper element comprising a plurality of bound pages, and at least a first page and a second page sandwiching opposite sides of said plurality of bound pages, wherein said first page comprises an embossed plastic layer of an embossed plastic material and said second page comprises an expanded thermoplastic layer of an expanded thermoplastic material; and said embossed plastic layer being arranged opposite to said expanded thermoplastic layer.

2. A bound paper element according to claim 1, wherein at least one of said first page and said second page has at least one friction layer that is arranged adjacent one of the opposite sides of the plurality of bound pages and that is made of material having a coefficient of friction sufficient to maintain the at least one of said first page and said second page substantially fixed with respect to the plurality of bound pages.

3. A bound paper element according to claim 1, wherein at least one of a book binding and a ribbon binding provides binding for the plurality of bound pages.

4. A bound paper element according to claim 1, wherein at least one of said first page and said second page (4) comprises a layer (3d, 4c) selected from a group consisting of cardboard, resins and thermoplastic rubbers.

5. A bound paper element according to claim 1, wherein said second page (4) is provided with a sideways-folding extension.

6. A bound paper element according to claim 1, wherein at least one corner of at least one of said first page and said second page is rounded.

7. A bound paper element according to claim 1, further comprising a binding that binds the plurality of bound pages and the first page and the second page together to form a stack, the binding being selected from a group consisting of a spiral type, an open rigid type, a paper covered type, a book type, and a ribbon type, the binding being arranged to secure at most one edge of the stack together to permit an opposite edge of the stack to freely move relative to each other about the binding.

8. A bound paper element according to claim 7, further compromising a plurality of pages between the first page and the second page as part of the stack and being bound by the binding at the one side of the stack.

\* \* \* \* \*